Patented Oct. 13, 1925.

1,557,265

UNITED STATES PATENT OFFICE.

RICHARD C. MILLER, OF WINFIELD, LONG ISLAND, NEW YORK, ASSIGNOR OF ONE-HALF TO TOCH BROTHERS, INCORPORATED, OF NEW YORK, N. Y., A CORPORATION OF NEW YORK.

DISAZO DYE.

No Drawing.    Application filed November 29, 1924.   Serial No. 752,934.

*To all whom it may concern:*

Be it known that I, RICHARD C. MILLER, a citizen of the United States, residing at Winfield, Long Island, in the county of Queens and State of New York, have invented certain new and useful Improvements in Disazo Dyes, of which the following is a specification.

This invention relates to dyes which are fast to light and insoluble in water but sufficiently soluble in non-aqueous materials such as waxes, oils, spirits, rubber, rubber substitutes, celluloid solvents, lacquers and the like, that they may be used for coloring such materials.

The dyes of my invention are compounds prepared by combining the diazo compounds of para-amino-azoxylenes with betahydroxy-naphthoic acids and have in the free state most probably the following formula:

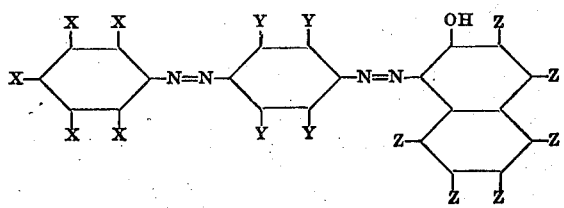

in which two of the X's stand for methyl groups, two of the Y's stand for methyl groups and one of the Z's stands for a carboxyl group.

The invention is illustrated in the following specific example: 25 parts by weight of para-amino-azoxylene having the formula:

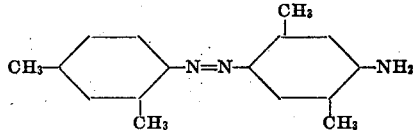

are mixed with 35 parts by weight of hydrochloric acid and 250 parts by weight of water, and the mixture is brought to a temperature of 60° C., after which 7 parts by weight of sodium nitrite dissolved in 25 parts by weight of water are added and the mixture well stirred. The resulting solution of the diazo compound of para-amino-azoxylene is then poured into a cold aqueous solution of 20 parts by weight of betahydroxy-naphthoic acid

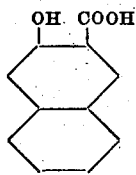

8 parts by weight of caustic soda and 10.6 parts by weight of sodium carbonate. The resulting precipitate is filtered, washed and dried. The product in its dry powdered form is of a very dark brownish red color. It is soluble in concentrated sulfuric acid to a blue color. It is very insoluble in water but dissolves readily in non-aqueous materials such as waxes, oils, etc., producing a brilliant red color with a deep blue undertone fast to light. The product of the foregoing example in its free state has most probably the formula:

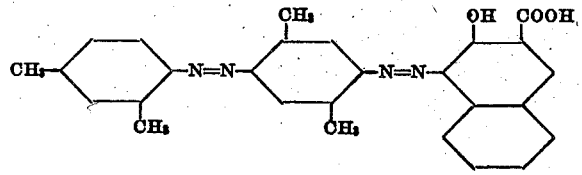

I claim:—

1. As new products, compounds formed by the combination of the diazo compounds of para-aminoazoxylenes with betahydroxynaphthoic acids, said products being insoluble in water, fast to light, and soluble in non-aqueous materials and having in the free state most probably the formula:

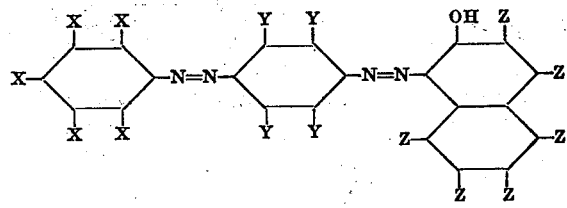

in which two of the X's stand for methyl groups, two of the Y's stand for methyl groups, and one of the Z's stands for a carboxyl group.

2. An oil soluble dye having in its free state most probably the formula:

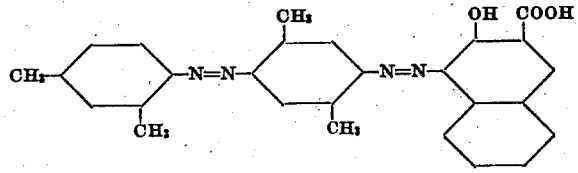

In testimony whereof, I affix my signature.

RICHARD C. MILLER.